(No Model.)
H. GATES.
WEEDING HOE.
No. 291,504. Patented Jan. 8, 1884.
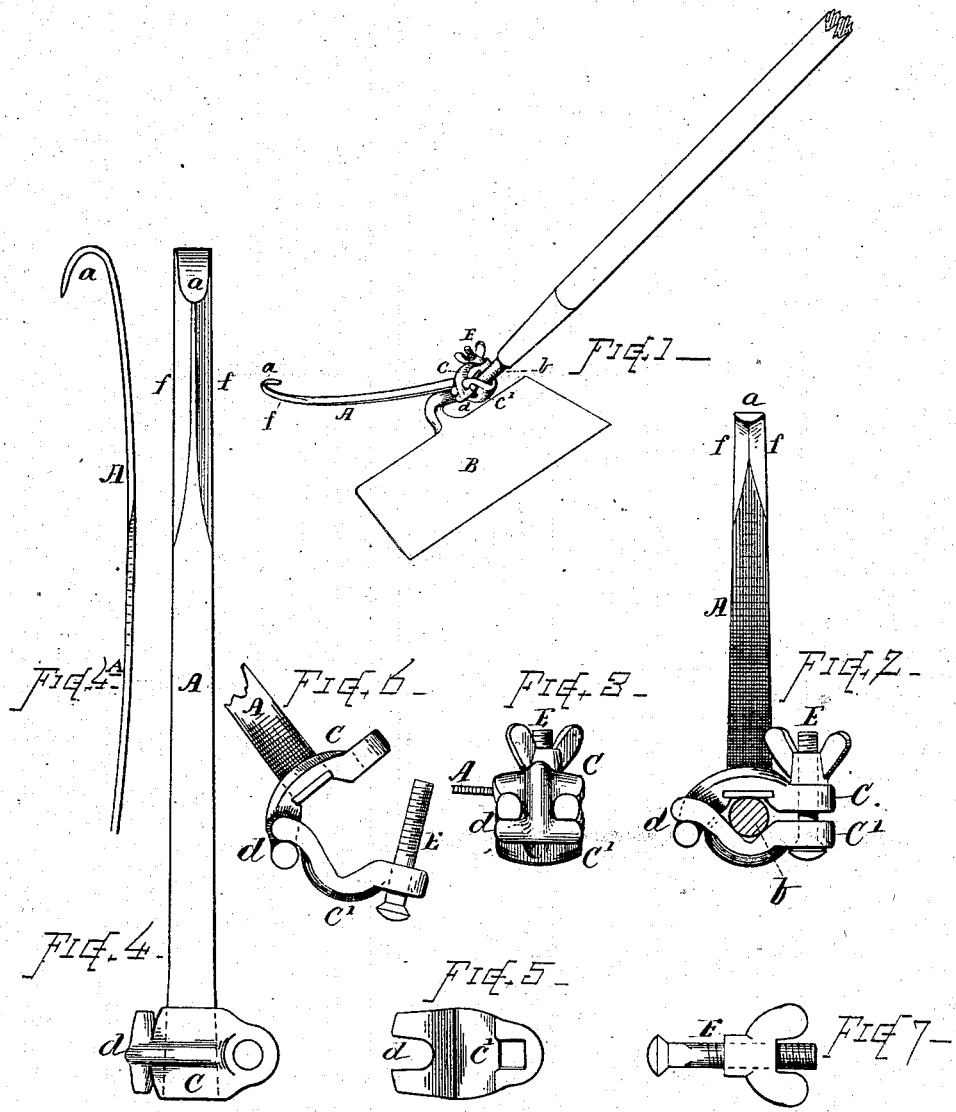
Witnesses
C. A. Gilman
Geo. M. Rice 2d
Inventor
Horatio Gates
By Chas. H. Burleigh
Atty.

UNITED STATES PATENT OFFICE.

HORATIO GATES, OF WORCESTER, MASSACHUSETTS.

WEEDING-HOE.

SPECIFICATION forming part of Letters Patent No. 291,504, dated January 8, 1884.

Application filed April 2, 1883. (No model.)

*To all whom it may concern:*

Be it known that I, HORATIO GATES, of Worcester, in the county of Worcester and State of Massachusetts, have invented certain new and useful Improvements in Weeding-Hoes; and I declare the following to be a description of my said invention sufficiently full, clear, and exact to enable others skilled in the art to which it appertains to make and use the same, reference being had to the accompanying drawings, which form a part of this specification.

The objects of my present invention are to provide a practical and efficient weeding-hook or cutting attachment for hand-hoes, by means of which small weeds can be cut or pulled from among the growing plants in a convenient manner, to provide facilities for the ready and secure attachment of the weeding hook or cutter to the hoe, and to afford a clamp or connecting device that will fit onto the shank of any ordinary hoe, and which will permit of the weed-cutting attachment being put on and taken off at pleasure, as desired.

To this end my invention consists in a weeding attachment or cutting device constructed and adapted for use substantially as hereinafter explained.

In the drawings, Figure 1 is a perspective view of a hoe having my improved weed-cutter applied thereto. Fig. 2 is an end view of the weeding device. Fig. 3 is a side view of the connecting-piece. Fig. 4 is a top view of the weed cutter or blade. Fig. 4ᵃ is a side view of the blade. Fig. 5 is a top view of the lower jaw or clamp-piece. Fig. 6 is an end view of the clamping-jaws opened. Fig. 7 is a view of the clamp-bolt separate from the jaws.

My weed-cutter consists of a long slender steel blade or thin narrow prong, A, the outer end of which is bent back to form a loop or hook, a, while the two sides along and near said hooked portion are ground sharp to form cutting-edges $ff$, so as to readily cut the weed-stalks that may be drawn into the loop or come in contact with the blade. This blade A is attached to the hoe in such a manner as to project forward and upward from the back thereof in the manner shown, so as to stand at a position where it will not interfere with the ordinary use of the hoe-blade B, but where it can be conveniently brought into action, when required, by simply reversing the hoe by rolling the handle over in the hand.

For connecting the blade or cutter A to the shank of the hoe, I employ in the present instance a pair of clamping-jaws, C and C', having a lock-hinge, $d$, at one side, and provided with a clamping-screw, E, at the other. These jaws are made of proper form to embrace the shank $b$ of the hoe, to give a firm and rigid support for the blade A, and are clamped to the shank with sufficient force to retain the weed-cutting blade A firmly and securely in position when in use. The end of the blade A is dovetailed or riveted into the under side of the top jaw, C, so as to be permanently attached thereto. The jaws may be formed of cast metal and the blades may be made from sheet-steel or other suitable material.

While I prefer the style of clamping-jaws herein shown, I do not desire to confine myself to this exact form, as any suitable clamp device or means whereby the blade A would be firmly attached to the hoe-shank could be employed without departure from the nature of my invention.

This hooked attachment can be manufactured and sold separately, to be attached to any ordinary hoe, as required, or may be sold with new hoes.

In applying my improvement to hoes when manufactured the hooked blade or weed-cutter A could, if desired, be permanently and rigidly connected to the hoe. In this case the hoe and cutter would be sold together, and would always remain connected.

In the use of the hoe with my improved attachment the long narrow blade can be inserted between the growing plants and the weeds standing among them can be pulled or cut out with the hook $a$ without injury to the plants and without the labor and inconvenience of stooping down to reach them with the hand.

The hook $a$, at the end of the blade, may be turned at a sharp angle, instead of a round curve, if desired.

What I claim as of my invention, and desire to secure by Letters Patent, is—

1. The combination, with a weeding-hoe, of a long thin projecting blade, A, extending forward and upward from the back of the hoe, and having a hook at its outer end adapted for inserting between growing plants for removing weeds from among them, as set forth.

2. A weed pulling or cutting attachment for hoes, consisting of the long narrow blade A, hooked and sharpened at its outer end, as described, and provided at its inner end with attaching-clamp, whereby it can be secured upon an ordinary weeding-hoe in the manner substantially as set forth.

3. The combination, with a weeding-hoe, of a long thin blade or forwardly-projecting curved finger formed of sheet-steel, with sharp cutting-edges, as $ff$, at its outer end, said blade being arranged in relation to the main blade B of the hoe in the manner substantially as described, for the purpose set forth.

4. The combination, with a weeding-hoe, of the long thin forwardly-projecting blade or weed-cutter A, detachably connected to the shank of the hoe by means of the clamping mechanism C C', adapted to embrace said shank and blade, substantially as set forth.

5. The combination of the weed-cutting blade A, the clamping-jaw C, rigidly fixed upon the end of said blade, the clamp-jaw C', grooved to embrace the shank, and connected to jaw C by a lock-hinge, $d$, and the clamping-screw E, as and for the purposes set forth.

Witness my hand this 26th day of March, A. D. 1883.

HORATIO GATES.

Witnesses:
CHAS. H. BURLEIGH,
EDW. R. GATES.